United States Patent
Binder

[11] 3,836,111
[45] Sept. 17, 1974

[54] CYLINDRICAL MOLD FOR THE PRODUCTION OF A PLURALITY OF OPTICAL LENSES

[75] Inventor: Joseph Binder, Forest Hills, N.Y.

[73] Assignee: Ashland Optical Corporation, New York, N.Y.

[22] Filed: Nov. 24, 1972

[21] Appl. No.: 309,235

Related U.S. Application Data

[63] Continuation of Ser. No. 150,040, June 4, 1971, abandoned.

[52] U.S. Cl. .................. 249/121, 249/127, 249/129, 249/164, 249/173, 425/808
[51] Int. Cl. ............................................ B29d 11/00
[58] Field of Search .......................... 249/119–121, 249/127–128, 134, 139, 154, 160, 164, 168, 170, 173, 169, 124; 425/808

[56] References Cited
UNITED STATES PATENTS

| | | | |
|---|---|---|---|
| 926,965 | 7/1909 | Shaw | 249/134 |
| 1,013,536 | 1/1912 | De Forrest | 249/127 |
| 3,565,389 | 2/1971 | Price | 249/121 |

Primary Examiner—J. Spencer Overholser
Assistant Examiner—John McQuade
Attorney, Agent, or Firm—Ostrolenk Faber Gerb & Soffen

[57] ABSTRACT

A plurality of plastic eyeglass lenses are molded simultaneously using apparatus comprising a plurality of optical mold elements held in generally parallel spaced relationship in annular interior grooves of a horizontally extending elongated cylindrical resilient holder disposed within the cylindrical cavity of a rigid holder. The latter is provided with an openable cover mounted to horizontal hinges and defining the upper half of the cylindrical cavity. With the cover open the resilient holder may be entered into and withdrawn from the cylindrical cavity and the resilient holder may be deformed for mounting the mold elements.

11 Claims, 6 Drawing Figures

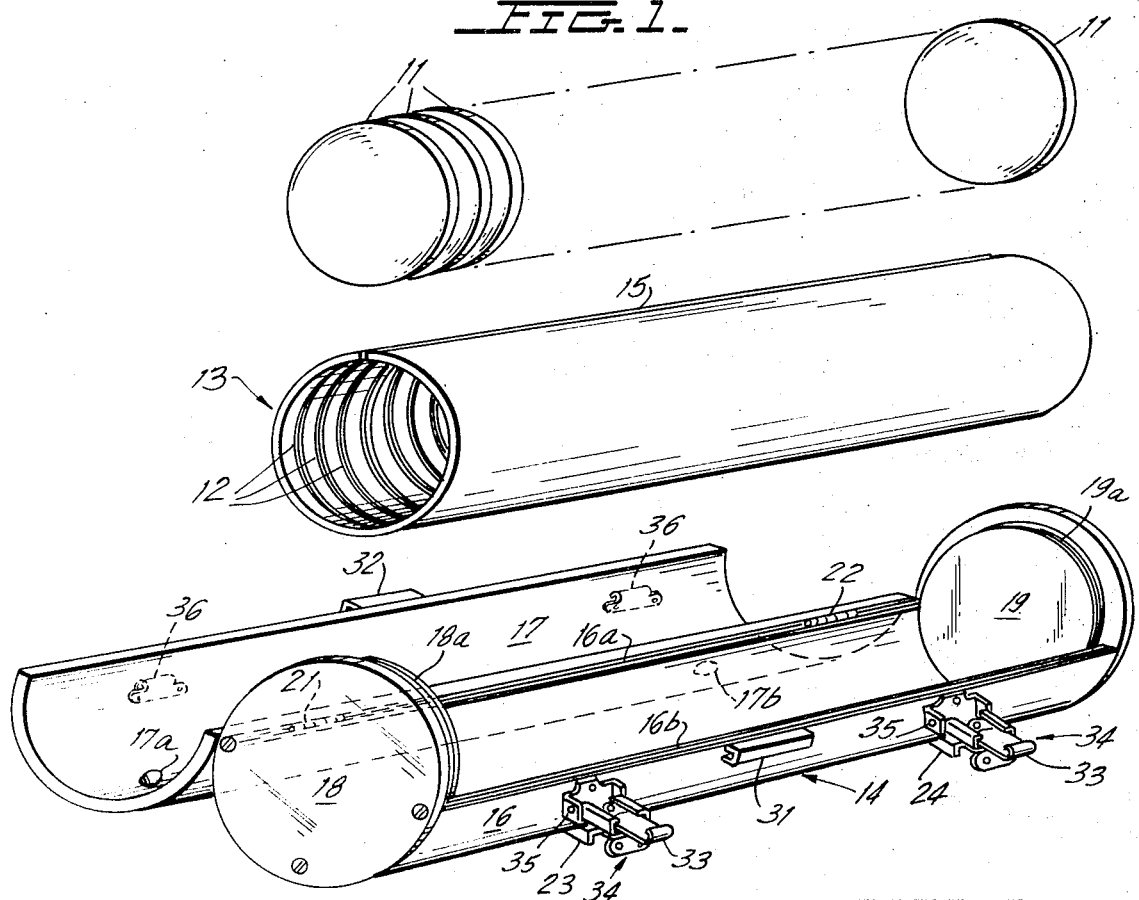
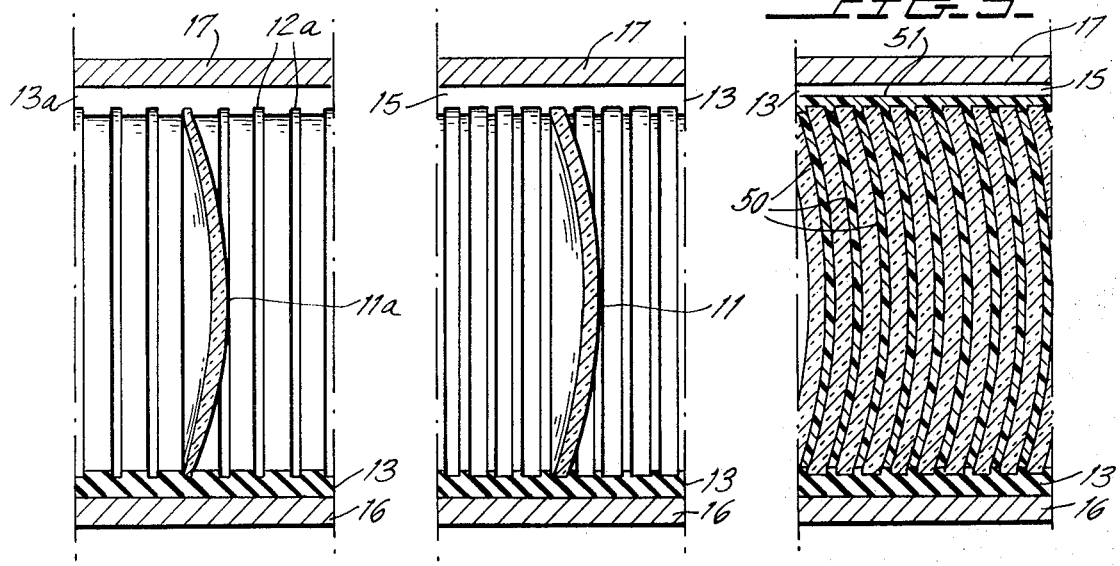

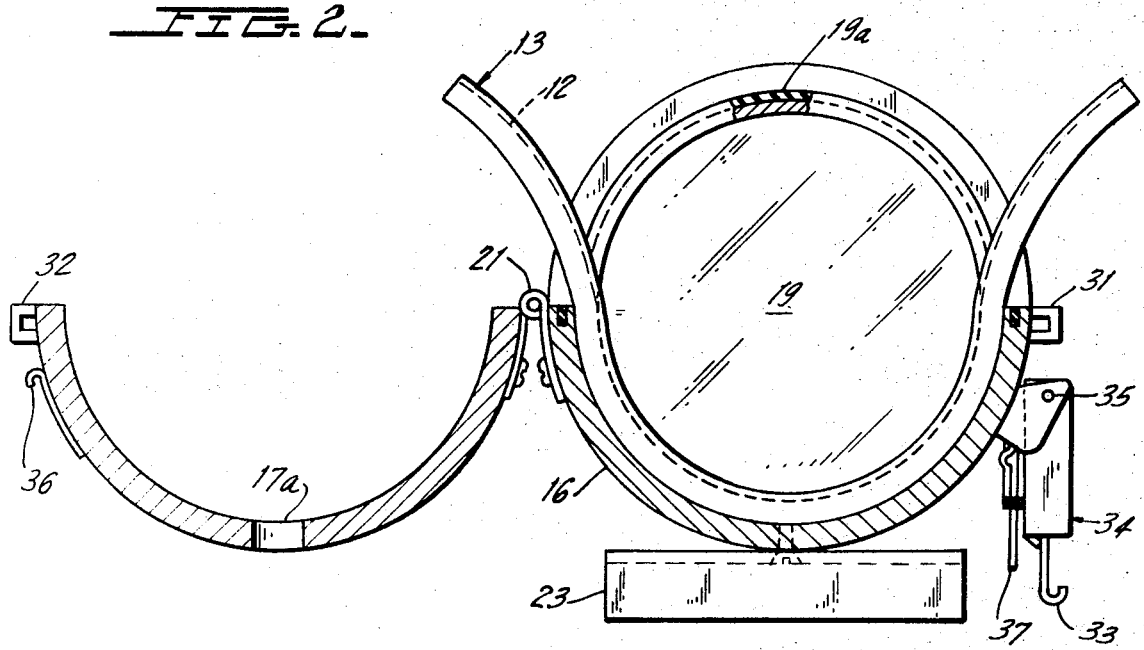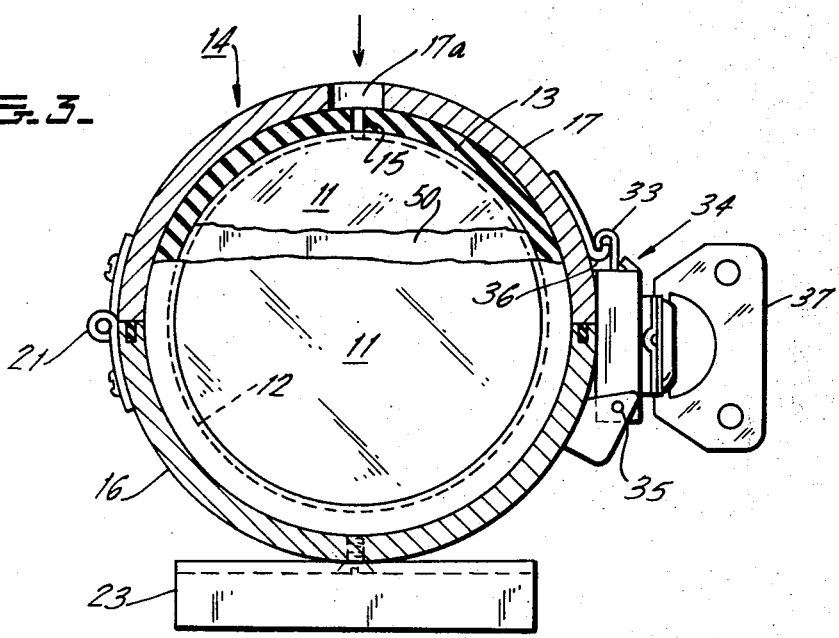

CYLINDRICAL MOLD FOR THE PRODUCTION OF A PLURALITY OF OPTICAL LENSES

This is a continuation of application Ser. No. 150,040, filed June 4, 1971 now abandoned.

This application relates to the manufacture of optical plastic lenses in general and more particularly relates to the simultaneous casting of a plurality of plastic eyeglass lenses.

Recently it has become increasingly evident that serious eye injuries, and even blindness, occur much too often as a result of the breaking of glass eyeglass lenses. This fact, coupled with improvements in the hardness and color purity of transparent plastics, has stimulated the demand for plastic eyeglass lenses.

However, the manufacture of plastic eyeglass lenses in accordance with prior art methods has proven unnecessarily costly in that the lenses were cast one or two at a time. Typical prior art methods for casting plastic eyeglass lenses are illustrated in U.S. Pat. No. 2,964,501 issued Dec. 13, 1960 to G. M. J. Sarofeen for "Glycol Carbonate Addition Polymers" and U.S. Pat. No. 3,211,811 issued Oct. 12, 1965 to R. K. Lanman for "Method and Apparatus for Casting Thermosetting Plastic Lenses."

In accordance with the instant invention, apparatus is provided for simultaneously casting a plurality of optical plastic lenses. Briefly, this apparatus includes a plurality of optical mold elements engaged along their edges by groove formations in the interior surface of a resilient cylindrical holder. The latter is disposed within a cylindrical cavity so proportioned that the resilient holder is prevented from distorting and permitting shifting of the mold elements. The apparatus is positioned so that the cylindrical axis of the resilient holder is horizontal. A full length slot in the resilient holder positioned at the top thereof provides a gate or channel for the flow of liquid plastic material into the cavities formed between adjacent optical mold elements. When all of these cavities are filled with plastic material, the filled mold is placed in an elevated temperature environment for thermosetting of the plastic material to produce the desired plastic eyeglass lenses.

Different lens thicknesses are obtained by using a resilient holder having different spacings between the grooves which hold the optical mold elements and different lens curvatures are obtained by utilizing differently shaped optical mold elements.

Accordingly, a primary object of the instant invention is to provide novel means for simultaneously casting a plurality of plastic eyeglass lenses.

Another object is to provide apparatus of this type which is very flexible insofar as its ability to produce plastic eyeglass lenses of different thicknesses and different curvatures.

A further object is to provide apparatus of this type in which an elongated resilient holder is utilized to position a plurality of optical mold elements.

A further object is to provide a longitudinally slit cylindrical resilient holder within which a plurality of optical mold elements are readily mounted.

These objects as well as other objects of this invention will become readily apparent after reading the following description of the accompanying drawings in which:

FIG. 1 is an exploded perspective of molding apparatus constructed in accordance with teachings of the instant invention.

FIG. 2 is a vertical transverse cross-section through the apparatus of FIG. 1, with the cover of the rigid holder open and the resilient holder spread to a position for mounting and dismounting of optical mold elements.

FIG. 3 is a view similar to that of FIG. 2, with the cover of the rigid holder closed.

FIG. 4 is a fragmentary vertical longitudinal cross-section of the apparatus of FIG. 1, with a single optical mold element mounted by the resilient holder.

FIG. 5 is a fragmentary vertical longitudinal cross-section of the apparatus of FIG. 6 after pouring of the liquid casting material.

FIG. 6 is a view similar to that of FIG. 4 showing a modified resilient holder and a modified disk mold element.

Now referring to the Figures. Apparatus constructed in accordance with teachings of the instant invention for simultaneously casting a plurality of plastic optical lenses consists of a plurality of optical disk mold elements 11 operatively positioned by annular grooves 12 in the interior wall of elongated cylindrical resilient holder 13 disposed within an elongated cylindrical cavity defined by rigid holder 14.

Interior annular grooves 12 of resilient holder 13 are formed about the longitudinal axis of holder 13 as a center and are equally spaced along this longitudinal axis. The upper portion of resilient holder 13 is provided with a full-length longitudinally extending slot 15 which provides a gate or channel through which plastic molding material flows to fill the cavities between adjacent mold elements 11.

Rigid holder 14 includes elongated lower and upper wall sections 16, 17, each of semi-circular cross-section. Lower wall section 16 is rigidly secured to circular end walls 18, 19 and upper wall section 17, constituting an openable cover, is pivotally mounted on horizontal hinges 21, 22 to one edge of lower wall section 16. Transverse channel-like legs 23, 24 secured to the bottom of lower wall section 16 maintain rigid holder 14 so positioned that the free edges at the top of lower wall section 16 are disposed in a common horizontal plane.

Longitudinal gaskets 16a, 16b along the free edges of lower wall section 16 and semi-circular gaskets 18a, 19a mounted to end walls 18, 19, respectively, are engaged by cover 17 when the latter is in closed position. Stops 31, 32 mounted to wall sections 16, 17, respectively, engage when cover 17 is clamped tight, thereby limiting deformation of gaskets 16a, 16b, 18a, 19a. With cover 32 closed, hook elements 33 of latching units 34, pivoted at 35 to lower wall section 16, are brought into engagement with hook members 36. As knobs 37 of units 34 are rotated clockwise with respect to FIG. 1, hook elements 33 are drawn downward to move cover 17 to a tightly closed position, wherein stops 31, 32 are in engagement.

With cover 17 in its closed position of FIG. 3, holes 17a, 17b near opposite ends thereof communicate with slot 15 in resilient holder 13. One of the holes 17a, 17b constitutes an aperture through which liquid plastic molding material is loaded into the apparatus, and the other of the holes 17a, 17b constitutes an aperture through which venting takes place while the apparatus is being loaded with liquid plastic molding material.

To use the apparatus hereinbefore described, feet 23, 24 are placed on a horizontal surface, cover 17 is opened and resilient holder 13 is placed within the trough provided by lower wall section 16. The ends of resilient holder 13 defining slot 15 are bent outwardly beyond the free edges of lower wall section 16 to the positions shown in FIG. 2. The edges of mold elements 11 are entered into the lower portions of annular grooves 12 and after each of these grooves 12 is occupied by an individual mold element 11, the deformed portions of resilient holder 13 are permitted to resume their natural positions, being helped thereto as required in order to assure that all portions of grooves 12 are occupied by peripheral edges of mold elements 11. Cover 17 is then closed, cooperating hooks 33, 36 are brought into engagement, and knobs 37 are operated to draw cover 17 to its tightly closed position.

Plastic molding material in liquid form is poured into rigid holder 14, through say hole 17a, and flows through slot 15 into the cavities formed between adjacent mold elements 11. When all of these cavities are filled, as evidenced by the appearance of molding material that does not recede from the vent hole 17b, pouring of the molding material is stopped and the loaded apparatus is placed in an oven at an elevated temperature for thermosetting of the plastic molding material.

When the apparatus is withdrawn from the oven, the rigid holder 14 is opened and resilient holder 13 is withdrawn and separated from mold elements 11 and the solidified plastic molding material. The mold elements are removed from between the plastic lenses 50 and the plastic connecting piece 51, formed in slot 15, is separated from lenses 50.

Usually, each annular groove 12 of resilient holder 13 is loaded with the same type of optical mold element 11 so that identical plastic lenses 50 are produced. However, in some cases one or more of the mold elements may be of different curvatures, in which event the resulting plastic lenses will not all be identical. While mold element 11 is of uniform thickness throughout so that convex lenses 50 are of uniform thicknesses, it should be apparent to those skilled in the art that the shapes of the mold elements may be of non-uniform thickness for the production of special lenses, just as mold element 11a of FIG. 4A is thicker at its center than along its edge so that the lens produced when using a pair of mold elements 11a will be thinner at its center than along its edges. Still further, it is noted that resilient holder 13a of FIG. 4A is constructed so that spacings between annular grooves 12a thereof is substantially greater than the spacings between annular grooves 12 of resilient holder 13.

Preferably, mold elements 11, 11a are constructed of optically ground glass, resilient holder 13 is constructed of a silicone rubber, and rigid holder 14 is constructed of metal. Typically, rigid holder 14 is approximately 12 inches long and 3½ inches in diameter for the simultaneous production of between 40 and 50 eyeglass lenses. A suitable plastic material for casting lenses 50 contains approximately 4 percent iso propyl percarbonate with the remainder being allyl diglicol carbonate. The latter ingredient is sold commercially under the designation CR 39.

Thus, it is seen that the instant invention provides novel apparatus for simultaneously casting a plurality of optical plastic lenses. The resilient and rigid holders of this apparatus are constructed to facilitate loading of the optical mold elements and unloading of the cast plastic lenses. The resilient holder is formed readily by utilizing a cylindrical metal core having suitable surface formations complementary to the mold element receiving grooves of the resilient holder.

Although there have been described preferred embodiments of this novel invention, many variations and modifications will now be apparent to those skilled in the art. Therefore, this invention is to be limited not by the specific disclosure herein but only by the appending claims.

I claim:

1. Apparatus for simultaneously casting a plurality of optical plastic lenses; said apparatus including a plurality of optical mold elements, at least four in number; a resilient holder bearing positioning means in operative engagement with the periphery of each of said mold elements to position said mold elements in generally parallel relationship and spaced from one another to form mold cavities between adjacent ones of said mold elements; a rigid holder engaging the exterior of said resilient holder to prevent distortion of the latter or shifting of said mold elements; and aperture means extending through said holders and through which molding material is loaded into said mold cavities; said resilient holder being cylindrical and said rigid holder defining a cylindrical cavity wherein said resilient holder is disposed.

2. Apparatus as set forth in claim 1 in which the positioning means includes a plurality of interior grooves in said resilient holder; said grooves being in spaced generally parallel planes with the periphery of each of said mold elements being disposed within an individual one of said grooves.

3. Apparatus as set forth in claim 1, further characterized in that there are rigid end walls defining the cylindrical cavity.

4. Apparatus as set forth in claim 1, further characterized in that it also includes means for positioning the rigid holder with the longitudinal axis of the cylindrical cavity substantially horizontal; said rigid holder having an operable cover through which said resilient holder is inserted into said cylindrical cavity.

5. Apparatus as set forth in claim 4, further characterized in that the cover extends for substantially the full length of said rigid holder and defines the upper half of said cylindrical cavity; with said cover open and said resilient holder seated in the lower half of said resilient cavity upper portions of said resilient holder being outwardly deflectable in opposite directions to permit insertion and/or removal of said mold elements.

6. Apparatus as set forth in claim 4, further characterized in that the aperture means includes a longitudinal slot in said resilient holder positioned at the top thereof and extending for substantially the full length thereof.

7. Apparatus as set forth in claim 6, further characterized in that the plurality of optical mold elements are positioned so that the optical axes of the cast optical plastic lenses extend along the longitudinal axis of the resilient holder.

8. Apparatus as set forth in claim 7, further characterized in that the cover extends for substantially the full length of said rigid holder and essentially defines the entire upper half of the cylindrical cavity.

9. Apparatus as set forth in claim 8, further characterized in that the cover is pivotally mounted on a horizontal axis; and releasable locking means for retaining said cover in its closed position.

10. Apparatus as set forth in claim 9, further characterized in that said aperture means includes a first hole in said cover; a second hole in said cover constituting a vent means; with said cover closed said holes positioned near opposite ends of the cylindrical cavity and at the top thereof.

11. Apparatus as set forth in claim 1 in which the holders are longitudinally slit to form openable sections whereby molded products are removable from said apparatus and the latter is reusable.

* * * * *